US008174781B2

(12) United States Patent
Heeren et al.

(10) Patent No.: US 8,174,781 B2
(45) Date of Patent: May 8, 2012

(54) METHOD FOR SCREENING MAGNETIC-RECORDING HEADS

(75) Inventors: Scott E. Heeren, San Jose, CA (US); Masaki Kohno, San Jose, CA (US); Tue Ngo, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1038 days.

(21) Appl. No.: 12/115,461

(22) Filed: May 5, 2008

(65) Prior Publication Data

US 2009/0273854 A1 Nov. 5, 2009

(51) Int. Cl.
*G11B 5/455* (2006.01)
*G01R 33/00* (2006.01)

(52) U.S. Cl. ............................ 360/31; 324/212; 324/260
(58) Field of Classification Search ............. 324/207.21, 324/210–212, 260–262; 360/31, 77.06, 78.04
See application file for complete search history.

(56) References Cited

U.S. PATENT DOCUMENTS

| | | | |
|---|---|---|---|
| 4,725,968 A | 2/1988 | Baldwin et al. | |
| 5,602,689 A | 2/1997 | Kadlec et al. | |
| 5,706,080 A | 1/1998 | Pekin et al. | |
| 6,346,809 B1 | 2/2002 | Karam, II | |
| 6,369,971 B1 | 4/2002 | Everett | |
| 6,407,544 B1 | 6/2002 | Watanabe | |
| 6,538,838 B1 | 3/2003 | Sacks et al. | |
| 6,566,870 B2 | 5/2003 | Sorenson et al. | |
| 6,696,831 B2 | 2/2004 | Nozu | |
| 6,768,606 B2 | 7/2004 | Helms | |
| 6,768,609 B2 | 7/2004 | Heydt et al. | |
| 6,853,514 B2 * | 2/2005 | Li et al. .................... 360/77.04 |
| 7,940,490 B2 * | 5/2011 | Shelor ....................... 360/78.05 |
| 2005/0030672 A1 | 2/2005 | Takahashi | |
| 2007/0137024 A1 | 6/2007 | Yao et al. | |
| 2008/0267029 A1 * | 10/2008 | Miles ....................... 369/53.17 |

FOREIGN PATENT DOCUMENTS

WO WO-2007/091044 8/2007

OTHER PUBLICATIONS

Prabhakar, et al., "Estimation of Submicron Read-Width in Longitudinal Magnetic Recording", *IEEE Transactions on Magnetics*, vol. 40, No. 4, (Jul. 2004),2598-2600.
Sacks, et al., "MR Head Effects on PES Generation: Simulation and Experiment", *IEEE Transactions on Magnetics*, vol. 32, No. 3, (May 1996),1773-1778.
Kikuchi, Tracking et al., "Simulation of the Error Rate Performance of MR Heads with Servo", *The Magnetics Society of Japan*, vol. 22, No. 4, (Apr. 15, 1998),289-292.
Tomoyuki, et al., "HDD Emulation System for Head/Disk Evaluation—Read/Write Tester for Next Generation", *IEIC Technical Report*, vol. 103, No. 495, (2003),1-5.
Patland, Henry "Quasi Static Testing: Advanced Quasi-Static Testing Technology and Applications", *Integral Solutions Int'l*, (Mar. 20, 2003),1-37.

* cited by examiner

*Primary Examiner* — Will J Klimowicz

(57) ABSTRACT

A method for screening a magnetic-recording head utilizing a simulated-cross-track-gain profile of the magnetic-recording head to provide a manufacturing-qualified, magnetic-recording head. The method includes measuring a track profile of the magnetic-recording head, and providing the simulated-cross-track-gain profile of the magnetic-recording head synthesized utilizing the track profile of the magnetic-recording head. The method also includes calculating a peak-to-peak value of the simulated-cross-track-gain profile, and applying a selection criterion based on the peak-to-peak value of the simulated-cross-track-gain profile to screen the magnetic-recording head for use as the manufacturing-qualified, magnetic-recording head.

8 Claims, 11 Drawing Sheets

METHOD FOR SCREENING MAGNETIC-RECORDING HEADS

TECHNICAL FIELD

Embodiments of the present invention relate generally to the field of magnetic-recording-head and hard-disk-drive manufacturing.

BACKGROUND

The magnetic-recording, hard-disk-drive (HDD) industry is extremely competitive. The demands of the market for ever increasing storage capacity, storage speed, and other enhancement features compounded with the desire for low cost creates tremendous pressure for manufacturing economies. Therefore, any cost savings that can be found in the manufacturing process attracts significant attention on the part of engineers assigned the task of manufacturing these complex devices.

With the arrival of perpendicular-magnetic-recording (PMR) technology, the pressure for low-cost manufacturing has gained even greater importance due to the complex manufacturing processes and challenging design characteristics of components used in PMR HDDs. In particular, PMR heads have attracted significant attention from the HDD engineering community, because the asymmetry characteristics of PMR heads can have a significant impact on the yield of HDDs incorporating such technology. Therefore, lowering the cost of manufacturing PMR HDDs that incorporate PMR heads is of paramount importance for maintaining a competitive edge in the HDD manufacturing business.

SUMMARY

Embodiments of the present invention include a method for screening a magnetic-recording head utilizing a simulated-cross-track-gain profile of the magnetic-recording head to provide a manufacturing-qualified, magnetic-recording head. The method includes measuring a track profile of the magnetic-recording head, and providing the simulated-cross-track-gain profile of the magnetic-recording head synthesized utilizing the track profile of the magnetic-recording head. The method also includes calculating a peak-to-peak value of the simulated-cross-track-gain profile, and applying a selection criterion based on the peak-to-peak value of the simulated-cross-track-gain profile to screen the magnetic-recording head for use as the manufacturing-qualified, magnetic-recording head.

DESCRIPTION OF THE DRAWINGS

The accompanying drawings, which are incorporated in and form a part of this specification, illustrate embodiments of the invention and, together with the description, serve to explain the embodiments of the invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

Figure 1:
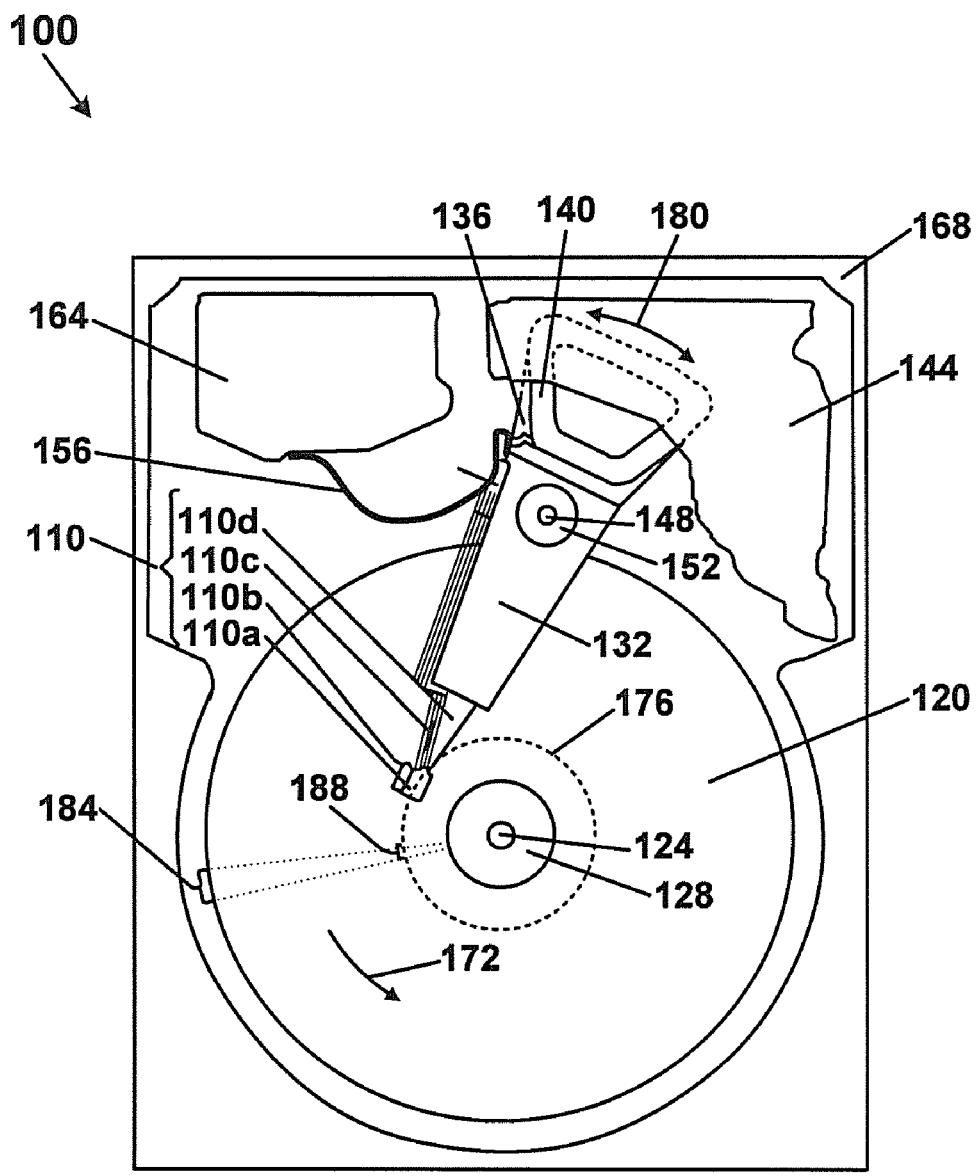
FIG. 1 is plan view of a hard-disk drive (HDD) illustrating the functional arrangement of a head-gimbal assembly (HGA) including a manufacturing-qualified, magnetic-recording head with respect to other components of the HDD in an embodiment of the present invention.

Physical Description of Embodiments of the Present Invention for a Hard-Disk Drive Incorporating a Manufacturing-Qualified, Magnetic-Recording Head With reference to FIG. 1, in accordance with an embodiment of the present invention, a plan view of a HDD 100 is shown. FIG. 1 illustrates the functional arrangement of a HGA 110 including a manufacturing-qualified, magnetic-recording head 110a with respect to other components of the HDD 100. The HDD 100 includes at least one HGA 110 including the manufacturing-qualified, magnetic-recording head 110a, which is selected based on a simulated-cross-track-gain profile synthesized utilizing a track profile that is measured of the manufacturing-qualified, magnetic-recording head 110a, a lead suspension 110c attached to the manufacturing-qualified, magnetic-recording head 110a, and a load beam 110d attached to a slider 110b, which includes the manufacturing-qualified, magnetic-recording head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the magnetic-recording disk 120. The manufacturing-qualified, magnetic-recording head 110a includes a write element, a so-called writer, and a read element, a so-called reader, for respectively writing and reading information stored on the magnetic-recording disk 120 of the HDD 100. The magnetic-recording disk 120 or a plurality (not shown) of magnetic-recording disks may be affixed to the spindle 124 with a disk clamp 128. The HDD 100 further includes an arm 132 attached to the HGA 110, a voice-coil motor (VCM) that includes an armature 136 including a voice coil 140 attached to the arm 132; and a stator 144 including a voice-coil magnet (not shown); the armature 136 of the VCM is attached to the arm 132 and is configured to move the arm 132 and the HGA 110 to access portions of the magnetic-recording disk 120 being mounted on a pivot 148 with an interposed pivot bearing 152.

With further reference to FIG. 1, in accordance with an embodiment of the present invention, electrical signals, for example, current to the voice coil 140 of the VCM, write signal to and read signal from the manufacturing-qualified, magnetic-recording head 110a, are provided by a flexible cable 156. Interconnection between the flexible cable 156 and the manufacturing-qualified, magnetic-recording head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, in conjunction with an HDD cover (not shown) provides a sealed, protective enclosure for the information storage components of the HDD 100.

With further reference to FIG. 1, in accordance with an embodiment of the present invention, other electronic components (not shown), including as a disk controller and servo electronics including a digital-signal processor (DSP), provide electrical signals to the drive motor, the voice coil 140 of the VCM and the manufacturing-qualified, magnetic-recording head 110a of the HGA 110. The electrical signal provided to the drive motor enables the drive motor to spin providing a torque to the spindle 124 which is in turn transmitted to the magnetic-recording disk 120 that is affixed to the spindle 124 by the disk clamp 128; as a result, the magnetic-recording disk 120 spins in a direction 172. The spinning magnetic-recording disk 120 creates a cushion of air that acts as an air bearing on which the air-bearing surface (ABS) of the slider 110b rides so that the slider 110b flies above the surface of the magnetic-recording disk 120 without making contact with a thin magnetic-recording medium of the magnetic-recording disk 120 in which information is recorded. The electrical signal provided to the voice coil 140 of the VCM enables the manufacturing-qualified, magnetic-recording head 110a of the HGA 110 to access a track 176 on which information is recorded. Thus, the armature 136 of the VCM swings through an arc 180 which enables the HGA 110 attached to the armature 136 by the arm 132 to access various tracks on the magnetic-recording disk 120. Information is stored on the magnetic-recording disk 120 in a plurality of concentric tracks (not shown) arranged in sectors on the top of the magnetic-recording disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the manufacturing-qualified, magnetic-recording head 110a of the HGA 110 reads the servo-burst-signal pattern which provides information to the servo electronics, which controls the electrical signal provided to the voice coil 140 of the VCM, enabling the manufacturing-qualified, magnetic-recording head 110a to follow the track 176. Upon finding the track 176 and identifying a particular sectored track portion 188, the manufacturing-qualified, magnetic-recording head 110a either reads data from the track 176 or writes data to the track 176 depending on instructions received by the disk controller from an external agent, for example, a microprocessor of a computer system.

Figure 2:
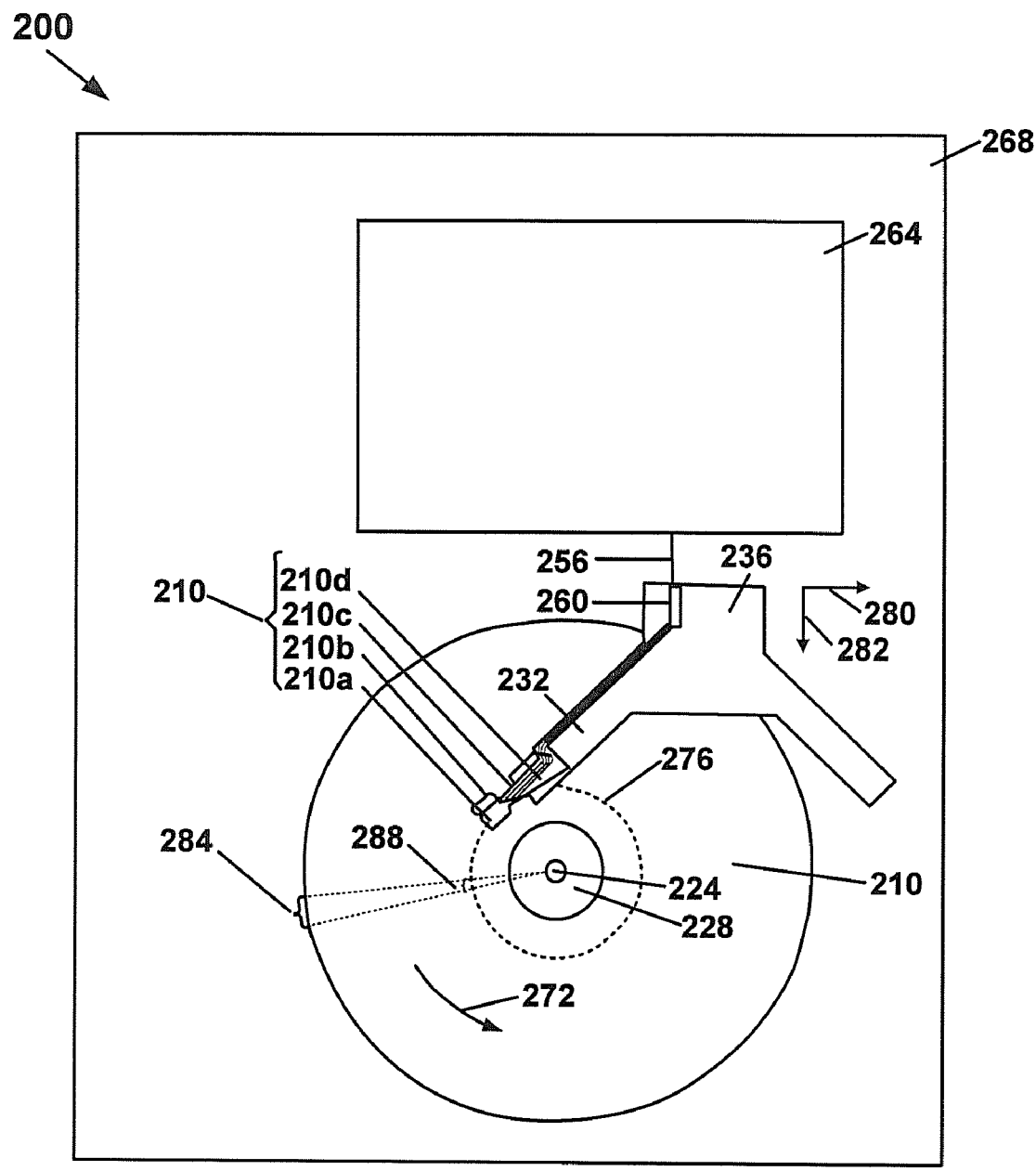
FIG. 2 is plan view of a spinstand used to obtain a track profile from a magnetic-recording head of the HGA to be screened for use in the HDD of FIG. 1 in an embodiment of the present invention.

With reference now to FIG. 2, in accordance with an embodiment of the present invention, as part of the screening procedure providing the manufacturing-qualified, magnetic-recording head 110a and prior to incorporation of a magnetic-recording head 210a as the manufacturing-qualified, magnetic-recording head 110a into the HDD 100, a track profile of the magnetic-recording head 210a is measured. In accordance with an embodiment of the present invention, measuring the track profile of the magnetic-recording head 210a is performed with a spinstand 200 with a track 276 written by the magnetic-recording head 210a. Alternatively, measuring the track profile of the magnetic-recording head 210a may be performed on the magnetic-recording head 210a suspended on a manufactured HGA, for example, HGA 210. The HGA 210 including the magnetic-recording head 210a is mounted on an arm 232 of a head loader 236 of the spinstand 200. The HGA 210 includes the magnetic-recording head 210a, a lead suspension 210c attached to the magnetic-recording head 210a, and a load beam 210d attached to a slider 210b, which includes the magnetic-recording head 210a at a distal end of the slider 210b; the slider 210b is attached at the distal end of the load beam 210d to a gimbal portion of the load beam 210d. The spinstand 200 also includes a magnetic-recording disk 220 rotatably mounted on a spindle 224 and a drive motor (not shown) attached to the spindle 224 for rotating the magnetic-recording disk 220. The magnetic-recording head 210a includes a write element, a so-called writer, and a read element, a so-called reader, for respectively writing and reading information stored on the magnetic-recording disk 220 of the spinstand 200. The magnetic-recording disk 220 may be affixed to the spindle 224 with a disk clamp 228. The head loader 236 of the spinstand 200 is configured to move the attached HGA 210 to access portions of the magnetic-recording disk 220.

With further reference to FIG. 2, in accordance with an embodiment of the present invention, electrical signals, for example, a write signal to and a read signal from the magnetic-recording head 210a, are provided by a flexible cable 256. Interconnection between the flexible cable 256 and the magnetic-recording head 210a may be provided by an AE module 260, which may have an on-board pre-amplifier for the read signal, as well as other read-channel and write-channel electronic components. The flexible cable 256 is coupled to a support electronics module 264, which provides electrical test and control signals to the magnetic-recording head 210a being tested. A vibration-damping table 268, for example, a granite block, provides a base for the components of the spinstand 200 that minimizes spurious vibrations that might interfere with measurement of the track profile.

With further reference to FIG. 2, in accordance with an embodiment of the present invention, the support electronics module 264, including as a disk controller and servo electronics, provides electrical signals to the drive motor, the stepper motors, or linear actuators, attached to the head loader 236 and the magnetic-recording head 210a of the HGA 210. The electrical signal provided to the drive motor enables the drive motor to spin providing a torque to the spindle 224 which is in turn transmitted to the magnetic-recording disk 220 that is affixed to the spindle 224 by the disk clamp 228; as a result, the magnetic-recording disk 220 spins in a direction 272. The spinning magnetic-recording disk 220 creates a cushion of air that acts as an air bearing on which the air-bearing surface (ABS) of the slider 210b rides so that the slider 210b flies above the surface of the magnetic-recording disk 220 without making contact with a thin magnetic-recording medium of the magnetic-recording disk 220 in which information is recorded. The electrical signal provided to the stepper motors, or linear actuators, attached to the head loader 236 enables the magnetic-recording head 210a of the HGA 210 to access the track 276 on which information is recorded. Thus, the head loader 236 moves along an x-direction 280 and a y-direction 282 which enables the HGA 210 attached to the head loader 236 to access various tracks on the magnetic-recording disk 220. Information is recorded on the magnetic-recording disk 220 in a plurality of concentric tracks (not shown) arranged in sectors on the top of the magnetic-recording disk 220, for example, sector 284. Correspondingly, each track is composed of a plurality of sectored track portions, for example, sectored track portion 288. Each sectored track portion 288 may be composed of recorded test data and a header containing a servo-burst-signal pattern, for example, an ABCD-servo-burst-signal pattern. In accessing the track 276, the read element of the magnetic-recording head 210a of the HGA 210 reads the servo-burst-signal pattern which provides information to the servo electronics, which controls the electrical signal provided to the stepper motors, or linear actuators, attached to the head loader 236, enabling the magnetic-recording head 210a to follow the track 276. Upon finding the track 276 and identifying a particular sectored track portion 288, the magnetic-recording head 210a either reads data from the track 276 or writes data to the track 276 depending on instructions received by the disk controller from an external agent, for example, a microprocessor of a computer system interfaced to the spinstand 200.

Figure 3:
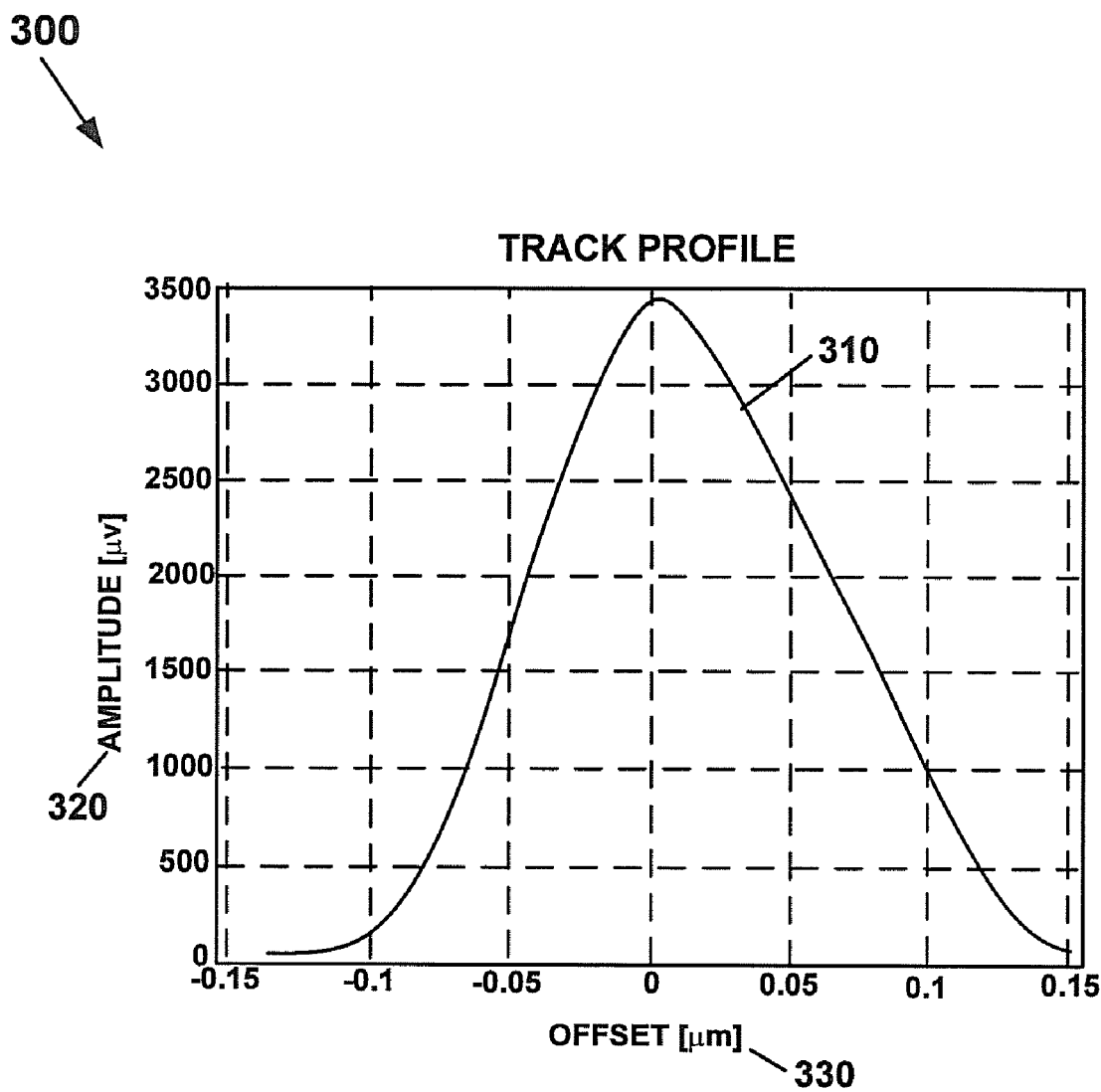
FIG. 3 is a plot of the track profile obtained on the spinstand of FIG. 2 from the magnetic-recording head of the HGA, by which track profile, the magnetic-recording head is later to be screened for use in the HDD of FIG. 1 through simulations utilizing the track profile in an embodiment of the present invention.

With reference now to FIG. 3, in accordance with an embodiment of the present invention, a plot 300 of a track profile 310 obtained on the spinstand 200 of FIG. 2 from the magnetic-recording head 210a of the HGA 210 is shown. The track profile 310 is plotted as amplitude 320 of the read-element signal in units of micro-volts ($\mu$V) as a function of offset 330 from track-center of track 276 in units of micrometers ($\mu$m), microns. The track profile 310 provides the raw data concerning the magnetic-recording head 210a that provides the basis for a method for screening the magnetic-recording head 210a for use in the HDD 100 of FIG. 1. The method for screening the magnetic-recording head 210a for use as the manufacturing-qualified, magnetic-recording head 110a utilizes the simulated-cross-track-gain profile of the magnetic-recording head 210a and includes measuring a track profile of the magnetic-recording head 210a. Subsequently, the track profile 310 of the magnetic-recording head 210a is utilized in synthesizing the simulated-cross-track-gain profile of the magnetic-recording head 210a. Based on the simulated-cross-track-gain profile, the method calculates a peak-to-peak value of the simulated-cross-track-gain profile, and applies a selection criterion based on the peak-to-peak value of the simulated-cross-track-gain profile to screen the magnetic-recording head 210a for use as the manufacturing-qualified, magnetic-recording head 110a. After the magnetic-recording head 210a is screened for acceptance, it may be incorporated into the HDD 100 as the manufacturing-qualified, magnetic-recording head 110a of HGA 110.

Figure 4A:
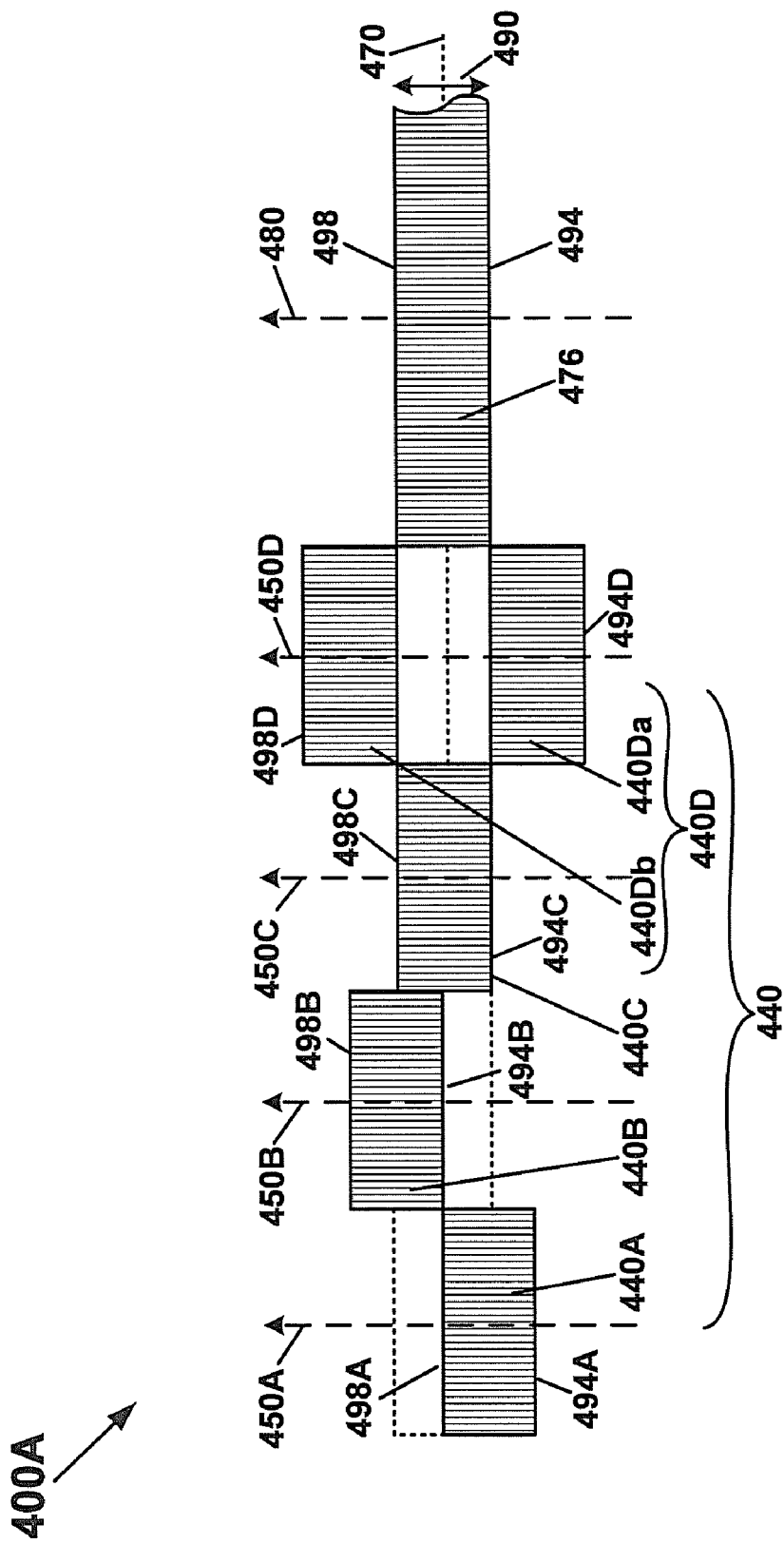
FIG. 4A is plan view of a portion of a track including a data track and a simulated ABCD-servo-burst-signal pattern illustrating the motion of the head across the track for obtaining the track profile, and the simulated motion of the head across separate simulated A, B, C and D servo-burst-signal fields for simulating simulated-servo-burst-signal profiles in an embodiment of the present invention.

With reference now to FIG. 4A, in accordance with an embodiment of the present invention, a plan view of a portion of a track 400A including a data track 476 and a simulated ABCD-servo-burst-signal pattern 440 is shown. FIG. 4A illustrates the motion of the head across the track 400A for obtaining the track profile 310. First, the data track 476 is written with the write-element of the magnetic-recording head 210a; the head is parked at a particular radial location on the magnetic-recording disk 220 by the head loader 236 at the center of track 400A, given by track-center 470, and the data track 476 is written on the magnetic-recording disk 220 corresponding to the track 276 shown in FIG. 2. Second, the stepper motors, or linear actuators, attached to the head loader 236 may be moved incrementally along the x-direction 280 and the y-direction 282 simultaneously so that the magnetic-recording head 210a moves along a radial direction of the magnetic-recording disk 220 along path 480 perpendicular to the data track 476. The path 480 may be broken up into as many as 100 equal incremental steps starting at a position at least about one track-width 490 from a track-edge 494 and ending at a position at least about one track-width 490 from the track-edge 498. As the magnetic-recording head 210a is moved along the path 480, the amplitude 320 of the output from the read-element of the magnetic-recording head 210a is read and may be plotted as a function of position given by the offset 330 from track-center 470. The track profile 310 of the magnetic-recording head 210a described above and described elsewhere herein was obtained using the spinstand 200 manufactured by Guzik.

With further reference to FIG. 3, in accordance with an embodiment of the present invention, the track profile 310 is seen to be asymmetric, that is the area under the curve to the right of the vertical line at zero offset is different from the area under the curve to the left of the vertical line at zero offset. This asymmetry in the track profile 310 is a consequence of the convolution of the transfer function of the read-element with the transfer function of the write-element each of which may exhibit asymmetries of their own. Thus, track profile 310 is a convolution of the asymmetry characteristics of both the write-element and the read-element of magnetic-recording head 210a. It should be noted that the asymmetry of the track profile 310 is particularly pronounced in perpendicular magnetic-recording (PMR) heads and can be a significant yield detractor raising the cost of PMR HDDs. Since screening the magnetic-recording head 210a utilizes the simulated-cross-track-gain profile of the magnetic-recording head 210a based on the track profile 310 convolving both the asymmetry characteristics of the write-element and the read-element of magnetic-recording head 210a, the method distinguishes itself from earlier screening methods relying more heavily on the spinstand 200 in arriving at a cross-track-gain profile and saves substantial time and cost in screening HGAs for acceptance in HDD manufacturing.

Figure 4B:
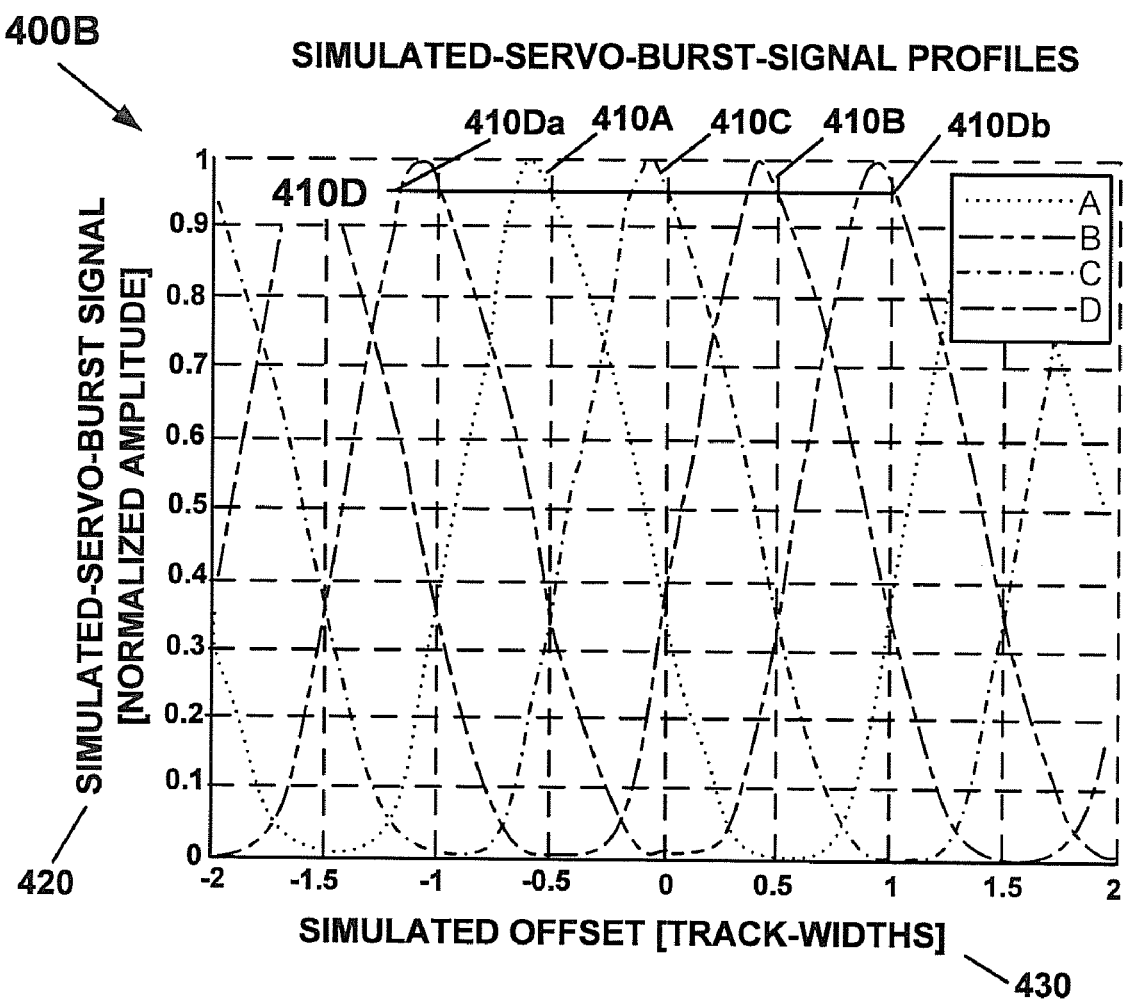
FIG. 4B is a plot of simulated-servo-burst-signal profiles corresponding to simulated A, B, C and D servo-burst-signal fields of a simulated-ABCD-servo-burst-signal pattern synthesized utilizing the track profile of the magnetic-recording head to be screened in an embodiment of the present invention.

With reference now to FIG. 4B and further reference to FIG. 4A, in accordance with an embodiment of the present invention, a portion of a simulated track including a simulated ABCD-servo-burst-signal pattern 440 is shown. FIG. 4A also illustrates the simulated motion of the head across each of the separate simulated A, B, C and D servo-burst-signal fields 440A, 440B, 440C and 440D, including an upper portion 440Da and a lower portion 440Db, along simulated paths 450A, 450B, 450C and 450D, respectively, in simulating first simulated-servo-burst-signal profile 410A, second simulated-servo-burst-signal profile 410B, third simulated-servo-burst-signal profile 410C and fourth simulated-servo-burst-signal profile 410D, including a first portion 410Da and a second portion 410Db, shown in the plot 400B of FIG. 4B. The first simulated-servo-burst-signal profile 410A, second simulated-servo-burst-signal profile 410B, third simulated-servo-burst-signal profile 410C and fourth simulated-servo-burst-signal profile 410D, including the upper portion 440Da and the lower portion 440Db, are plotted as simulated-servo-burst signal 420 in units of normalized amplitude of the read-element output signal as a function of simulated offset 430 from track-center 470. First, the writing of separate simulated A, B, C and D servo-burst-signal fields 440A, 440B, 440C and 440D, including the upper portion 440Da and the lower portion 440Db, are synthesized utilizing the track profile 310 of the magnetic-recording head 210a. Writing by the magnetic-recording head 210a at simulated radial locations on the magnetic-recording disk 220 corresponding to simulated offsets for each of the simulated A, B, C and D servo-burst-signal fields 440A, 440B, 440C and 440D, including the upper portion 440Da and the lower portion 440Db, is simulated: the simulated A-servo-burst-signal field 440A is synthesized as though it were at a simulated offset 430 of one-half track-width 490 below the track-center 470; the simulated B-servo-burst-signal field 440B is synthesized as though it were as though it were at a simulated offset 430 of one-half track-width 490 above the track-center 470; the simulated C-servo-burst-signal field 440C is synthesized as though it were at zero simulated offset 430 from track-center 470; and the simulated D-servo-burst-signal field of 440D, including the upper portion 440Da and the lower portion 440Db, are synthesized as though they were at a simulated offset 430 of a full track-width 490 below and above, respectively, the track-center 470.

Second, with further reference to FIGS. 4A and 4B, in accordance with an embodiment of the present invention, the motion of the magnetic-recording head 210a is simulated as though it were moving along the respective simulated paths 450A, 450B, 450C and 450D perpendicular to the data track 476 across each of the separate simulated A, B, C and D servo-burst-signal fields 440A, 440B, 440C and 440D, including the upper portion 440Da and the lower portion 440Db, respectively. Each of the simulated paths 450A, 450B, 450C and 450D may be broken up into as many as 100 equal incremental steps as though the magnetic-recording head 210a were starting at a simulated position at least about one track-width 490 from the respective simulated track-edges 494A, 494B, 494C and 494D and ending at a position at least about one track-width 490 from the respective simulated track-edges 498A, 498B, 498C and 498D. As the motion of the magnetic-recording head 210a is simulated as though it were moving along the simulated paths 450A, 450B, 450C and 450D, the simulated-servo-burst signal 420 in units of normalized amplitude of the read-element output signal is synthesized utilizing the track profile 310 of the magnetic-recording head 210a as a function of simulated offset 430 from track-center 470 in units of track-widths. The simulated-servo-burst signal 420 from the read-element of the magnetic-recording head 210a along each of the simulated paths 450A, 450B, 450C and 450D may be plotted as a function of position given by the simulated offset 430 from track-center 470 to provide: the first simulated-servo-burst-signal profile 410A, the second simulated-servo-burst-signal profile 410B, the third simulated-servo-burst-signal profile 410C, and the fourth simulated-servo-burst-signal profile 410D, which may include the first portion 410Da and the second portion 410Db. In accordance with an embodiment of the present invention, first simulated-servo-burst-signal profile 410A, second simulated-servo-burst-signal profile 410B, third simulated-servo-burst-signal profile 410C and fourth simulated-servo-burst-signal profile 410D, including the first portion 410Da and the second portion 410Db, may correspond respectively to simulated A, B, C and D servo-burst-signal fields 440A, 440B, 440C and 440D, including the upper portion 440Da and the lower portion 440Db; thus, simulating the first simulated-servo-burst-signal profile, the second simulated-servo-burst-signal profile, the third simulated-servo-burst-signal profile and the fourth simulated-servo-burst-signal profile includes respectively simulating a simulated-A-servo-burst-signal profile, a simulated-B-servo-burst-signal profile, a simulated-C-servo-burst-signal profile and a simulated-D-servo-burst-signal profile from the simulated ABCD-servo-burst-signal pattern 440. The simulations described above and described elsewhere herein were performed using MATLAB™ on a personal computer.

Figure 5:
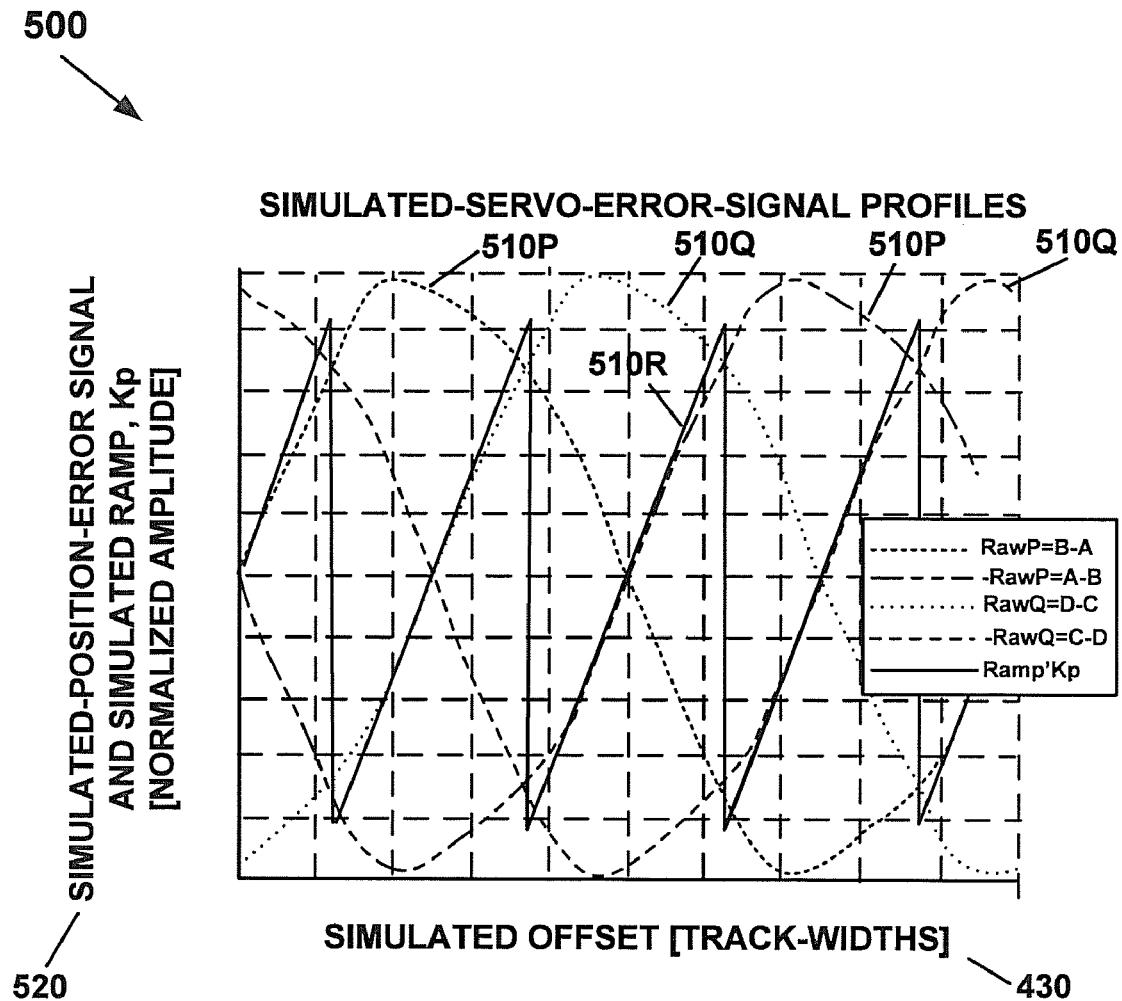
FIG. 5 is a plot of simulated-position-error-signal profiles derived from the simulated-servo-burst-signal profiles of FIG. 4B in an embodiment of the present invention.

With reference now to FIG. 5, in accordance with an embodiment of the present invention, a plot 500 of simulated-position-error-signal profiles 510P, 510Q, 510-P and 510-Q, derived from first simulated-servo-burst-signal profile 410A, second simulated-servo-burst-signal profile 410B, third simulated-servo-burst-signal profile 410C and fourth simulated-servo-burst-signal profile 410D, including the upper portion 440Da and the lower portion 440Db, of FIG. 4B, and a ramp, $K_p$, profile 510R derived from the simulated-position-error-signal profiles 510P and 510Q are shown. The simulated-position-error-signal profiles 510P, 510Q, 510-P, 510-Q and ramp, $K_p$, profile 510R are plotted as simulated-position-error signal 520 in units of normalized amplitude as a function of simulated offset 430 from track-center 470. The simulated-position-error-signal profiles 510P, 510Q, 510-P and 510-Q provide the data that is the basis for providing the simulated-cross-track-gain profile of the magnetic-recording head 210a. Providing the simulated-cross-track-gain profile includes simulating the first simulated-servo-burst-signal profile 410A, the second simulated-servo-burst-signal profile 410B, the third simulated-servo-burst-signal profile 410C and the fourth simulated-servo-burst-signal profile 410D synthesized utilizing the track profile 310 of the magnetic-recording head 210a, as described above. Providing the simulated-cross-track-gain profile also includes simulating a simulated-P-position-error-signal profile 510P as a function of simulated offset 430 from track-center 470 synthesized utilizing the first simulated-servo-burst-signal profile 410A and the second simulated-servo-burst-signal profile 410B of the magnetic-recording head 210a and simulating a simulated-Q-position-error-signal profile 510Q as a function of simulated offset 430 from track-center 470 synthesized utilizing the third simulated-servo-burst-signal profile 410C and the fourth simulated-servo-burst-signal profile 410D of the magnetic-recording head 210a. In addition, providing the simulated-cross-track-gain profile includes simulating the simulated-cross-track-gain profile as a function of simulated offset 430 from track-center 470 synthesized utilizing the simulated-P-position-error-signal profile 510P and the simulated-Q-position-error-signal profile 510Q.

With further reference to FIG. 5, in accordance with an embodiment of the present invention, the simulated-P-position-error-signal profile 510P may be synthesized by taking a difference between the second simulated-servo-burst-signal profile 410B and the first simulated-servo-burst-signal profile 410A of the magnetic-recording head 210a; and the simulated-Q-position-error-signal profile 510Q may be synthesized by taking a difference between the fourth simulated-servo-burst-signal profile 410D and the third simulated-servo-burst-signal profile 410C of the magnetic-recording head 210a. Similarly, the simulated-minusP-position-error-signal profile 510-P may be synthesized by taking a difference between the first simulated-servo-burst-signal profile 410A and the second simulated-servo-burst-signal profile 410B of the magnetic-recording head 210a; and the simulated-minusQ-position-error-signal profile 510-Q may be synthesized by taking a difference between the third simulated-servo-burst-signal profile 410C and the fourth simulated-servo-burst-signal profile 410D of the magnetic-recording head 210a. It should be noted that the simulated-minusP-position-error-signal profile 510-P is just the negative of the simulated-P-position-error-signal profile 510P, and the simulated-minusQ-position-error-signal profile 510-Q is just the negative of the simulated-Q-position-error-signal profile 510Q. The values of the ramp, $K_p$, profile 510R are given as a function of values of both the simulated-P-position-error-signal profile 510P and the simulated-Q-position-error-signal profile 510Q by the formula: $K_p = 1/(P^4 + Q^4)^{1/4}$ where P is a value of the simulated-P-position-error signal and Q is a value of the simulated-Q-position-error signal as a function of simulated offset 430 from track-center 470. The ramp, $K_p$, profile 510R provides one method for linearizing for the effects of asymmetries in the track profile 310 on values of the simulated-P-position-error signal of the simulated-P-position-error-signal profile 510P, and the simulated-Q-position-error signal of the simulated-Q-position-error-signal profile 510Q.

Figure 6:
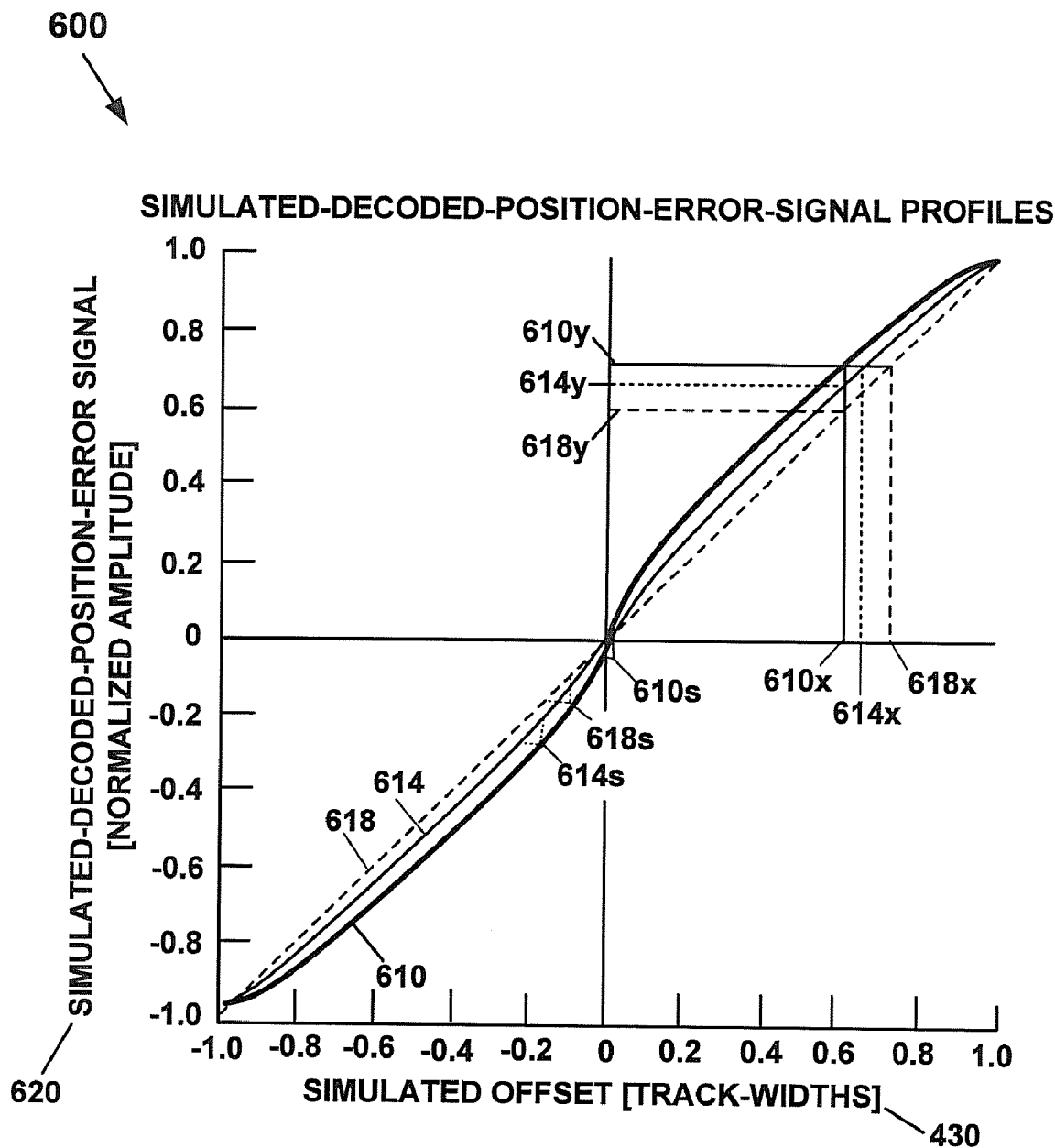
FIG. 6 is a plot of simulated-decoded-position-error-signal profiles derived from the simulated-servo-burst-signal profiles of FIG. 4B illustrating two methods of calibrating the simulated-decoded-position-error-signal profile and derivation of simulated-cross-track-gain-profiles from slope of the simulated-decoded-position-error-signal profile and calibrated-simulated-decoded-position-error-signal profile in an embodiment of the present invention.

With reference now to FIG. 6, in accordance with an embodiment of the present invention, a plot 600 of simulated-decoded-position-error-signal profile 610, also known in the art as the simulated-integrated-position-error-signal profile, derived from the simulated-P-position-error-signal profile 510P and the simulated-Q-position-error-signal profile 510Q of FIG. 4B is shown. The simulated-decoded-position-error-signal profile 610 is plotted as simulated-decoded-position-error signal 620 in units of normalized amplitude as a function of simulated offset 430 from track-center 470. In accordance with an embodiment of the present invention, the simulated-decoded-position-error-signal profile 610 may be synthesized by taking the sum of the simulated-P-position-error-signal profile 510P and the simulated-Q-position-error-signal profile 510Q of the magnetic-recording head 210a. The simulated-cross-track-gain profile 710 (see FIG. 7) is obtained as slope 610s of simulated-decoded-position-error-signal profile 610 as a function of simulated offset 430 from track-center 470. A calibrated-simulated-cross-track-gain profile 714 (see FIG. 7) is obtained as slope 614s of calibrated-simulated-decoded-position-error-signal profile 614 as a function of simulated offset 430 from track-center 470. A linearized-simulated-cross-track-gain profile 718 (see FIG. 7) is obtained as slope 618s of linearized-simulated-decoded-position-error-signal profile 618 as a function of simulated offset 430 from track-center 470. In an actual HDD, calibration of an actual decoded-position-error-signal profile, similar to simulated-decoded-position-error-signal profile 610, would be provided by a DSP (not shown). In an embodiment of the present invention, the calibrated-simulated-decoded-position-error-signal profile 614 is provided by simulation of the functionality of the DSP. Simulation of the function of the DSP would ideally remove all non-linearity from the simulated-decoded-position-error-signal profile 610 to provide a linearized-simulated-decoded-position-error-signal profile 618 with constant slope. However, simulation of the functionality of the DSP does not remove all non-linearity from the simulated-decoded-position-error-signal profile 610. It should be noted that, in calibrating the simulated-decoded-position-error-signal profile 610, the slope 614s of a calibrated-simulated-decoded-position-error-signal profile 614 ideally approaches a constant value over the domain of −1 track-width (TW) to +1 TW, for example, the slope 618s of the linearized-simulated-decoded-position-error-signal profile 618, but that in general the calibrated-simulated-decoded-position-error-signal profile 614 may not have a constant slope, which is within the spirit and scope of embodiments of the present invention. Obtaining the calibrated-simulated-cross-track-gain profile 714 based on calibrating the simulated-decoded-position-error-signal profile 610 is known in the art as calibrating the simulated-cross-track-gain profile 710.

With further reference to FIG. 6, in accordance with an embodiment of the present invention, calibrating the simulated-cross-track-gain profile 710 may be performed by two principal methods. A first method of calibrating the simulated-cross-track-gain profile 710 is illustrated in FIG. 6 in which the functionality of the DSP is simulated to determine for every abscissa value 610x of a first plurality of values of simulated offset 430 from track-center 470, corresponding to an ordinate value 610y of a second plurality of values of simulated-position-error signal, a calibrated-ordinate value 614y of a third plurality of values of calibrated-simulated-position-error signal providing a calibrated-simulated-position-error-signal profile 614, from which the calibrated-simulated-cross-track-gain profile 714 (see FIG. 7) is provided from the slope 614s, of the calibrated-simulated-position-error-signal profile 614 as a function of simulated offset 430 from track-center 470. It should be noted that, in calibrating the simulated-decoded-position-error-signal profile 610, calibrated-ordinate value 614y of a third plurality of values of calibrated-simulated-position-error signal ideally approaches a linearized-ordinate value 618y of a fifth plurality of values of linearized-simulated-position-error signal of the linearized-simulated-decoded-position-error-signal profile 618, but that in general the calibrated-simulated-decoded-position-error-signal profile 614 may not be completely linearized, which is within the spirit and scope of embodiments of the present invention. A second method of calibrating the simulated-cross-track-gain profile 710 is illustrated in FIG. 6 in which the functionality of the DSP is simulated to determine for every ordinate value 610y of a second plurality of values of simulated-position-error signal, corresponding to the abscissa value 610x of a first plurality of simulated offset 430 from track-center 470, a calibrated-abscissa value 614x of a fourth plurality of values of calibrated-simulated offset from track-center 470 providing a calibrated-simulated-position-error-signal profile 614, from which the calibrated-simulated-cross-track-gain profile 714 (see FIG. 7) is obtained as the slope 614s of the calibrated-simulated-position-error-signal profile 614 as a function of simulated offset 430 from track-center 470. It should be noted that, in calibrating the simulated-decoded-position-error-signal profile 610, the calibrated-abscissa value 614x of a fourth plurality of values of calibrated-simulated offset from track-center 470 ideally approaches a linearized-abscissa value 618x of a sixth plurality of values of linearized-simulated offset from track-center 470 of the linearized-simulated-decoded-position-error-signal profile 618, but that in general the calibrated-simulated-decoded-position-error-signal profile 614 may not be completely linearized, which is within the spirit and scope of embodiments of the present invention. Moreover, it should be noted that, in an actual HDD, values of the actual offset from track-center 470 would be determined by values of VCM current, and that values of actual calibrated offset from track-center 470 would be a function of calibrated VCM current. Thus, the abscissae of FIGS. 3, 4B, 5, 6 and 7 might be provided on an alternative basis given in units of current of the VCM through conversion of the offset 330 from track-center 470, or simulated offset 430 from track-center 470, to units of current, or simulated current, respectively.

Figure 7:
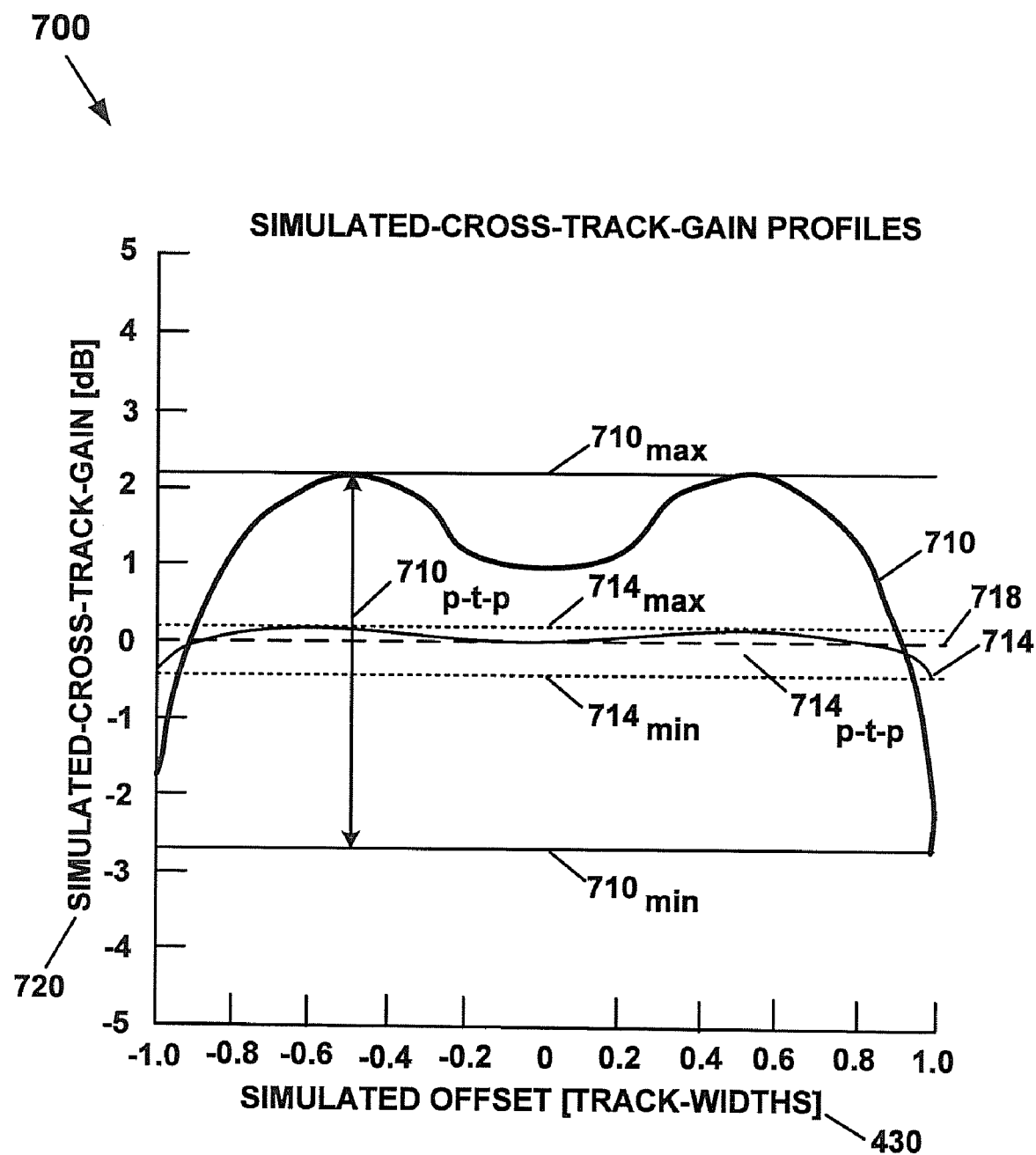
FIG. 7 is a plot of simulated-cross-track-gain profiles derived from the simulated-decoded-position-error-signal profiles of FIG. 6 in an embodiment of the present invention.

With reference now to FIG. 7, in accordance with an embodiment of the present invention, a plot 700 of simulated-cross-track-gain profiles 710, 714 and 718 derived from the simulated-decoded-position-error-signal profiles 610, 614 and 618, respectively, of FIG. 6 is shown. The of simulated-cross-track-gain profiles 710, 714 and 718 are plotted as simulated-cross-track gain 720 in units of decibels as a function of simulated offset 430 from track-center 470. The value, G, of the simulated-cross-track gain 720 is given by the following formula:

$$G = 20 \log_{10}(S_{PES}/S_{PESo}),$$

where $S_{PES}$ may be the value of: the slope 610s of the simulated-position-error-signal profile 610, the slope 614s of the calibrated-simulated-position-error-signal profile 614, or the slope 618s of the linearized-simulated-position-error-signal profile 618, at a value of a first plurality of values of simulated offset 430 from track-center 470; and, $S_{PESo}$ is the constant value of the slope 618s of the linearized-simulated-position-error-signal profile 618. It should be noted that values of the linearized-simulated-cross-track-gain profile 718 are identically zero as a function of simulated offset 430 from track-center 470; and, therefore, the linearized-simulated-cross-track-gain profile 718 provides a reference datum for the ideality of the simulated-cross-track-gain profiles 710 and 714.

With further reference to FIG. 7, in accordance with an embodiment of the present invention, the procedure for calculating a peak-to-peak value $710_{p-t-p}$ of the simulated-cross-track-gain profile 710 in providing the manufacturing-qualified, magnetic-recording head 110a is illustrated. Calculating the peak-to-peak value $710_{p-t-p}$ of the simulated-cross-track-gain profile 710 includes determining a maximum value $710_{max}$ of the simulated-cross-track-gain profile 710, determining a minimum value $710_{min}$ of the simulated-cross-track-gain profile 710, and calculating a difference between the maximum value $710_{max}$ of the simulated-cross-track-gain profile 710 and the minimum value $710_{min}$ of the simulated-cross-track-gain profile 710 such that the peak-to-peak value $710_{p-t-p}$ of the simulated-cross-track-gain profile 710 is given by the difference between the maximum value $710_{max}$ of the simulated-cross-track-gain profile 710 and the minimum value $710_{min}$ of the simulated-cross-track-gain profile 710. The magnetic-recording head 210a may be accepted as the manufacturing-qualified, magnetic-recording head 110a if the peak-to-peak value $710_{p-t-p}$ of the simulated-cross-track-gain profile 710 is less than about 2.5 dB; the HDD 110 may include the magnetic-recording head 210a thus selected for acceptance as the manufacturing-qualified, magnetic-recording head 110a shown in FIG. 1.

With further reference to FIG. 7, in accordance with an embodiment of the present invention, the procedure for applying the selection criterion to provide the manufacturing-qualified, magnetic-recording head 110a if the peak-to-peak value $710_{p-t-p}$ of the simulated-cross-track-gain profile 710 is greater than about 2.5 dB is also illustrated. Applying the selection criterion may include calibrating the simulated-cross-track-gain profile 710 to provide the calibrated-simulated-cross-track-gain profile 714 if the peak-to-peak value $710_{p-t-p}$ of the simulated-cross-track-gain profile 710 is greater than about 2.5 dB. In addition, applying the selection criterion may include calculating a calibrated-peak-to-peak value $714_{p-t-p}$ of the calibrated-simulated-cross-track-gain profile 714 that includes determining a maximum value $714_{max}$ of the calibrated-simulated-cross-track-gain profile 714, determining a minimum value $714_{min}$ of the calibrated-simulated-cross-track-gain profile 714, and calculating a difference between the maximum value $714_{max}$ of the calibrated-simulated-cross-track-gain profile 714 and the minimum value $714_{min}$ of the calibrated-simulated-cross-track-gain profile 714 such that the calibrated-peak-to-peak value $714_{p-t-p}$ of the calibrated-simulated-cross-track-gain profile 714 is given by the difference between the maximum value $714_{max}$ of the calibrated-simulated-cross-track-gain profile 714 and the minimum value $714_{min}$ of the calibrated-simulated-cross-track-gain profile 714. Moreover, applying the selection criterion may include accepting the magnetic-recording head 210a as the manufacturing-qualified, magnetic-recording head 110a if the calibrated-peak-to-peak value $714_{p-t-p}$ of the calibrated-simulated-cross-track-gain profile 714 of the magnetic-recording head 210a is less than about 2.5 dB; the HDD 110 may include the magnetic-recording head 210a thus selected for acceptance as the manufacturing-qualified, magnetic-recording head 110a shown in FIG. 1. It should be noted that it may be required that the calibration procedure be applied iteratively to a previously calibrated-simulated-cross-track-gain profile to bring a calibrated-peak-to-peak value of a calibrated-simulated-cross-track-gain profile to be less than about 2.5 dB. If after a reasonable number of attempts to calibrate the magnetic-recording head 210a have been applied without successfully bringing a calibrated-peak-to-peak value of a calibrated-simulated-cross-track-gain profile to be less than about 2.5 dB, the magnetic-recording head 210a may be rejected as scrap being unsuitable for use as the manufacturing-qualified, magnetic-recording head 110a.

Figure 8:
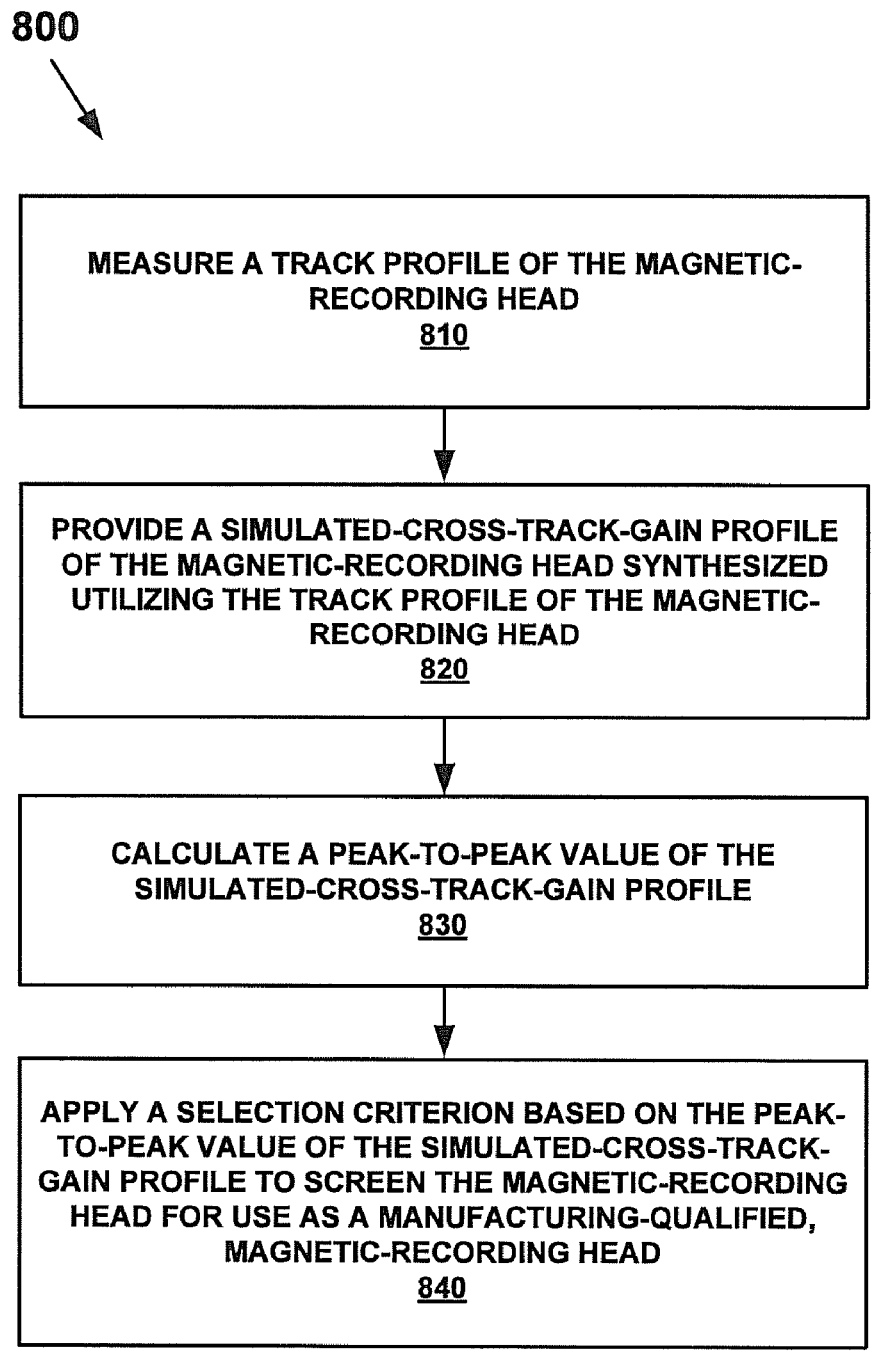
FIG. 8 is flow chart illustrating a method for screening a magnetic-recording head for use as a manufacturing-qualified, magnetic-recording head utilizing a simulated-cross-track-gain profile of the magnetic-recording head in an embodiment of the present invention.

Description of Embodiments of the Present Invention for a Method of Screening a Magnetic-Recording Head for use as a Manufacturing-Qualified, Magnetic-Recording Head Utilizing a Simulated-Cross-Track-Gain Profile of The Magnetic-Recording Head With reference now to FIG. 8, in accordance with an embodiment of the present invention, a flow chart 800 illustrates a method for screening a magnetic-recording head for use as a manufacturing-qualified, magnetic-recording head utilizing a simulated-cross-track-gain profile of the magnetic-recording head. At 810, a track profile of the magnetic-recording head is measured. Measuring the track profile of the magnetic-recording head may be performed with a spinstand with a data track written by the magnetic-recording head. Also, measuring the track profile of the magnetic-recording head may be performed on the magnetic-recording head suspended on a manufactured head-gimbal assembly. At 820, the simulated-cross-track-gain profile of the magnetic-recording head synthesized utilizing the track profile of the magnetic-recording head is provided. At 830, a peak-to-peak value of the simulated-cross-track-gain profile is calculated. Calculating the peak-to-peak value of the simulated-cross-track-gain profile includes determining a maximum value of the simulated-cross-track-gain profile, determining a minimum value of the simulated-cross-track-gain profile, and calculating a difference between the maximum value of the simulated-cross-track-gain profile and the minimum value of the simulated-cross-track-gain profile such that the peak-to-peak value of the simulated-cross-track-gain profile is given by the difference between the maximum value of the simulated-cross-track-gain profile and the minimum value of the simulated-cross-track-gain profile. At 840, a selection criterion based on the peak-to-peak value of the simulated-cross-track-gain profile is applied to screen the magnetic-recording head for use as the manufacturing-qualified, magnetic-recording head. Applying the selection criterion includes accepting the magnetic-recording head as the manufacturing-qualified, magnetic-recording head if the peak-to-peak value of the simulated-cross-track-gain profile of the magnetic-recording head is less than about 2.5 dB.

Figure 9:
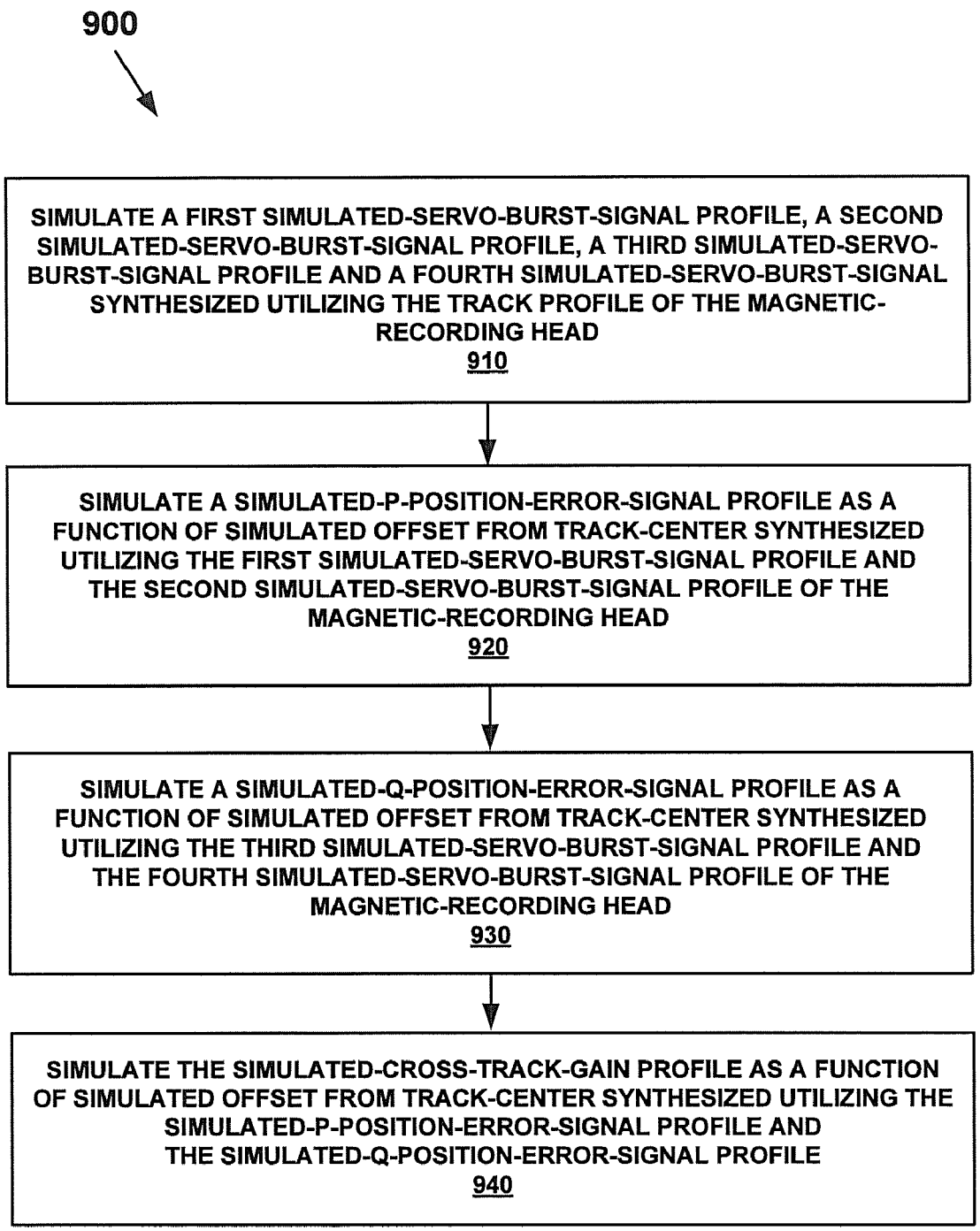
FIG. 9 is flow chart illustrating the method of providing the simulated-cross-track-gain profile of the magnetic-recording head in the method of screening the magnetic-recording head in an embodiment of the present invention.

With reference now to FIG. 9, in accordance with an embodiment of the present invention, a flow chart 900 illustrates the method of providing the simulated-cross-track-gain profile of the magnetic-recording head in the method of screening the magnetic-recording head of FIG. 8. At 910, a first simulated-servo-burst-signal profile, a second simulated-servo-burst-signal profile, a third simulated-servo-burst-signal profile and a fourth simulated-servo-burst-signal profile synthesized utilizing the track profile of the magnetic-recording head are simulated. Simulating the first simulated-servo-burst-signal profile, the second simulated-servo-burst-signal profile, the third simulated-servo-burst-signal profile and the fourth simulated-servo-burst-signal profile may include respectively simulating a simulated-A-servo-burst-signal profile, a simulated-B-servo-burst-signal profile, a simulated-C-servo-burst-signal profile and a simulated-D-servo-burst-signal profile from a simulated ABCD-servo-burst-signal pattern. At 920, a simulated-P-position-error-signal profile is simulated as a function of simulated offset from track-center synthesized utilizing the first simulated-servo-burst-signal profile and the second simulated-servo-burst-signal profile of the magnetic-recording head. At 930, a simulated-Q-position-error-signal profile is simulated as a function of simulated offset from track-center synthesized utilizing the third simulated-servo-burst-signal profile and the fourth simulated-servo-burst-signal profile of the magnetic-recording head. At 940, the simulated-cross-track-gain profile is simulated as a function of simulated offset from track-center synthesized utilizing the simulated-P-position-error-signal profile and the simulated-Q-position-error-signal profile.

With further reference now to FIGS. 8 and 9, if the peak-to-peak value of the simulated-cross-track-gain profile is greater than about 2.5 dB, applying the selection criterion may further include calibrating the simulated-cross-track-gain profile to provide a calibrated-simulated-cross-track-gain profile, calculating a calibrated-peak-to-peak value of the calibrated-simulated-cross-track-gain profile, and accepting the magnetic-recording head as the manufacturing-qualified, magnetic-recording head if the calibrated-peak-to-peak value of the calibrated-simulated-cross-track-gain profile of the magnetic-recording head is less than about 2.5 dB. Calculating the calibrated-peak-to-peak value of the calibrated-simulated-cross-track-gain profile may include determining a maximum value of the calibrated-simulated-cross-track-gain profile, determining a minimum value of the calibrated-simulated-cross-track-gain profile, and calculating a difference between the maximum value of the calibrated-simulated-cross-track-gain profile and the minimum value of the calibrated-simulated-cross-track-gain profile such that the calibrated-peak-to-peak value of the calibrated-simulated-cross-track-gain profile is given by the difference between the maximum value of the calibrated-simulated-cross-track-gain profile and the minimum value of the calibrated-simulated-cross-track-gain profile. Calibrating the simulated-cross-track-gain profile may further include simulating a functionality of a digital-signal processor to determine for every abscissa value of a first plurality of values of simulated offset from track-center, corresponding to an ordinate value of a second plurality of values of simulated-position-error signal, a calibrated ordinate value of a third plurality of values of calibrated-simulated-position-error signal providing a calibrated-simulated-position-error-signal profile from which the calibrated-simulated-cross-track-gain profile is provided from slope of the calibrated-simulated-position-error-signal profile as a function of simulated offset from track-center. Alternatively, calibrating the simulated-cross-track-gain profile may further include simulating a functionality of a digital-signal processor to determine for every ordinate value of a second plurality of values of simulated-position-error signal, corresponding to an abscissa value of a first plurality of values of simulated offset from track-center, a calibrated abscissa value of a fourth plurality of values of calibrated-simulated offset from track-center providing a calibrated-simulated-position-error-signal profile from which the calibrated-simulated-cross-track-gain profile is obtained as slope of the calibrated-simulated-position-error-signal profile as a function of simulated offset from track-center.

Figure 10:
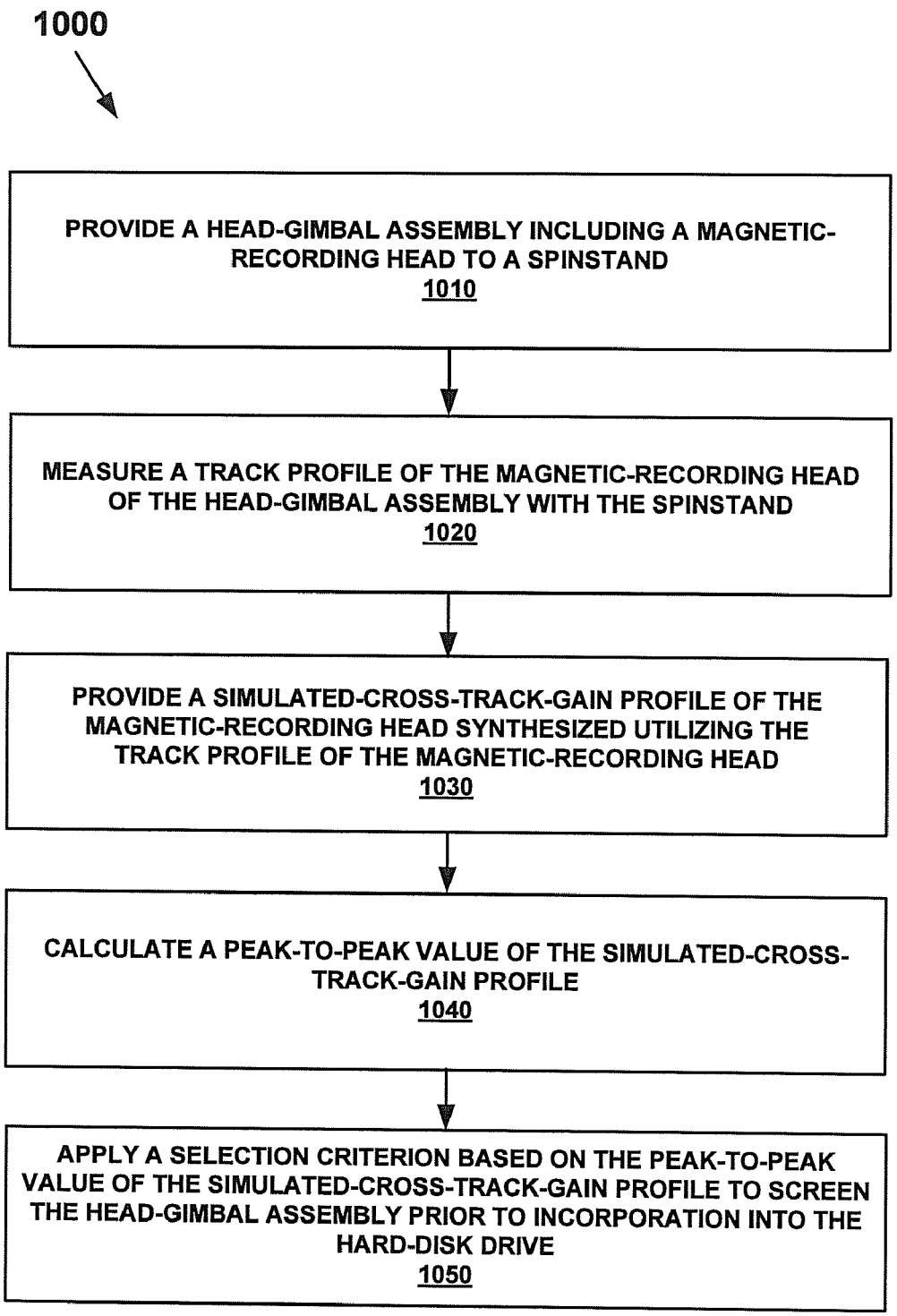
FIG. 10 is flow chart illustrating a method for manufacturing a HDD utilizing HGA screening to provide a manufacturing-qualified HGA including the manufacturing-qualified, magnetic-recording head in an embodiment of the present invention.

Description of Embodiments of the Present Invention for a Method of Manufacturing a HDD Utilizing HGA Screening to Provide a Manufacturing-Qualified HGA Including a Manufacturing-Qualified, Magnetic-Recording Head With reference to FIG. 10, in accordance with an embodiment of the present invention, a flow chart 1000 illustrates a method for manufacturing a HDD utilizing HGA screening to provide a manufacturing-qualified HGA including the manufacturing-qualified, magnetic-recording head. At 1010, a head-gimbal assembly including a magnetic-recording head is provided to a spinstand. At 1020, a track profile of the magnetic-recording head of the head-gimbal assembly is measured with the spinstand. At 1030, a simulated-cross-track-gain profile of the magnetic-recording head synthesized utilizing the track profile of the magnetic-recording head is provided. At 1040, a peak-to-peak value of the simulated-cross-track-gain profile is calculated. The procedure for calculating the peak-to-peak value of the simulated-cross-track-gain profile is described above in the discussion following 830 of FIG. 8. At 1050, a selection criterion based on the peak-to-peak value of the simulated-cross-track-gain profile is applied to screen the HGA prior to incorporation into the HDD. Applying the selection criterion includes accepting the HGA as the manufacturing-qualified HGA including the manufacturing-qualified, magnetic-recording head if the peak-to-peak value of the simulated-cross-track-gain profile of the magnetic-recording head is less than about 2.5 dB.

With further reference now to FIG. 10, if the peak-to-peak value of the simulated-cross-track-gain profile is greater than about 2.5 dB, applying the selection criterion may further include calibrating the simulated-cross-track-gain profile to provide a calibrated-simulated-cross-track-gain profile, calculating a calibrated-peak-to-peak value of the calibrated-simulated-cross-track-gain profile, and accepting the HGA as the manufacturing-qualified HGA including the manufacturing-qualified, magnetic-recording head if the calibrated-peak-to-peak value of the calibrated-simulated-cross-track-gain profile of the magnetic-recording head is less than about 2.5 dB. The procedure for calculating the calibrated-peak-to-peak value of the calibrated-simulated-cross-track-gain profile is described above in the discussion of FIGS. 8 and 9. Similarly, two alternative procedures for calibrating the simulated-cross-track-gain profile are described above in the discussion of FIGS. 8 and 9. The method for manufacturing a HDD utilizing HGA screening further includes incorporating into the HDD the manufacturing-qualified HGA including the manufacturing-qualified, magnetic-recording head that has been accepted after applying the selection criterion.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for screening a magnetic-recording head for use as a manufacturing-qualified, magnetic-recording head utilizing a simulated-cross-track-gain profile of said magnetic-recording head, said method comprising:
    measuring a track profile of said magnetic-recording head;
    providing said simulated-cross-track-gain profile of said magnetic-recording head synthesized utilizing said track profile of said magnetic-recording head;
    calculating a peak-to-peak value of said simulated-cross-track-gain profile;
    applying a selection criterion based on said peak-to-peak value of said simulated-cross-track-gain profile to screen said magnetic-recording head for use as said manufacturing-qualified, magnetic-recording head,
    wherein providing said simulated-cross-track-gain profile of said magnetic-recording head further comprises:
        simulating a first simulated-servo-burst-signal profile, a second simulated-servo-burst-signal profile, a third simulated-servo-burst-signal profile and a fourth simulated-servo-burst-signal profile synthesized utilizing said track profile of said magnetic-recording head;
        simulating a simulated-P-position-error-signal profile as a function of simulated offset from track-center synthesized utilizing said first simulated-servo-burst-signal profile and said second simulated-servo-burst-signal profile of said magnetic-recording head;
        simulating a simulated-Q-position-error-signal profile as a function of simulated offset from track-center synthesized utilizing said third simulated-servo-burst-signal profile and said fourth simulated-servo-burst-signal profile of said magnetic-recording head; and
        simulating said simulated-cross-track-gain profile as a function of simulated offset from track-center synthesized utilizing said simulated-P-position-error-signal profile and said simulated-Q-position-error-signal profile; and
    wherein applying said selection criterion further comprises:
        accepting said magnetic-recording head as said manufacturing-qualified, magnetic-recording head if said peak-to-peak value of said simulated-cross-track-gain profile of said magnetic-recording head is less than about 2.5 dB.

2. The method recited in claim 1, wherein simulating said first simulated-servo-burst-signal profile, said second simulated-servo-burst-signal profile, said third simulated-servo-burst-signal profile and said fourth simulated-servo-burst-signal profile further comprises respectively simulating a simulated-A-servo-burst-signal profile, a simulated-B-servo-burst-signal profile, a simulated-C-servo-burst-signal profile and a simulated-D-servo-burst-signal profile from a simulated ABCD-servo-burst-signal pattern.

3. The method recited in claim 1, wherein said measuring said track profile of said magnetic-recording head is performed with a spinstand with a data track written by said magnetic-recording head.

4. The method recited in claim 1, wherein said measuring said track profile of said magnetic-recording head is performed on said magnetic-recording head suspended on a manufactured head-gimbal assembly.

5. The method recited in claim 1, wherein calculating said peak-to-peak value of said simulated-cross-track-gain profile further comprises:
    determining a maximum value of said simulated-cross-track-gain profile;
    determining a minimum value of said simulated-cross-track-gain profile; and
    calculating a difference between said maximum value of said simulated-cross-track-gain profile and said minimum value of said simulated-cross-track-gain profile;
    wherein said peak-to-peak value of said simulated-cross-track-gain profile is given by said difference between said maximum value of said simulated-cross-track-gain profile and said minimum value of said simulated-cross-track-gain profile.

6. The method recited in claim 1, wherein applying said selection criterion further comprises:
    calibrating said simulated-cross-track-gain profile to provide a calibrated-simulated-cross-track-gain profile if said peak-to-peak value of said simulated-cross-track-gain profile is greater than about 2.5 dB;
    calculating a calibrated-peak-to-peak value of said calibrated-simulated-cross-track-gain profile comprising:
        determining a maximum value of said calibrated-simulated-cross-track-gain profile;
        determining a minimum value of said calibrated-simulated-cross-track-gain profile; and
        calculating a difference between said maximum value of said calibrated-simulated-cross-track-gain profile and said minimum value of said calibrated-simulated-cross-track-gain profile;
    wherein said calibrated-peak-to-peak value of said calibrated-simulated-cross-track-gain profile is given by said difference between said maximum value of said calibrated-simulated-cross-track-gain profile and said minimum value of said calibrated-simulated-cross-track-gain profile; and accepting said magnetic-recording head as said manufacturing-qualified, magnetic-recording head if said calibrated-peak-to-peak value of said calibrated-simulated-cross-track-gain profile of said magnetic-recording head is less than about 2.5 dB.

7. The method recited in claim 6, wherein calibrating said simulated-cross-track-gain profile further comprises simulating a functionality of a digital-signal processor to determine for every abscissa value of a first plurality of values of simulated offset from track-center, corresponding to an ordinate value of a second plurality of values of simulated-position-error signal, a calibrated ordinate value of a third plurality of values of calibrated-simulated-position-error signal providing a calibrated-simulated-position-error-signal profile from which said calibrated-simulated-cross-track-gain profile is provided from slope of said calibrated-simulated-position-error-signal profile as a function of simulated offset from track-center.

8. The method recited in claim 6, wherein calibrating said simulated-cross-track-gain profile further comprises simulating a functionality of a digital-signal processor to determine for every ordinate value of a second plurality of values of simulated-position-error signal, corresponding to an abscissa value of a first plurality of values of simulated offset from track-center, a calibrated abscissa value of a fourth plurality of values of calibrated-simulated offset from track-center providing a calibrated-simulated-position-error-signal profile from which said calibrated-simulated-cross-track-gain profile is obtained as slope of said calibrated-simulated-position-error-signal profile as a function of simulated offset from track-center.

* * * * *

UNITED STATES PATENT AND TRADEMARK OFFICE
CERTIFICATE OF CORRECTION

PATENT NO.        : 8,174,781 B2
APPLICATION NO.   : 12/115461
DATED             : May 8, 2012
INVENTOR(S)       : Heeren et al.

Page 1 of 1

It is certified that error appears in the above-identified patent and that said Letters Patent is hereby corrected as shown below:

OTHER PUBLICATIONS: Delete: "Kikuchi, Tracking et al., "Simulation of the Error Rate Performance of MR Heads with Servo", The Magnetics Society of Japan, vol. 22, No. 4, (Apr. 15, 1998), 289-292."

Insert: --Kikuchi, et al., "Simulation of the Error Rate Performance of MR Heads with Tracking Servo", The Magnetics Society of Japan, vol. 22, No. 4, (Apr. 15, 1998), 289-292.--

Signed and Sealed this
Twentieth Day of November, 2012

David J. Kappos
*Director of the United States Patent and Trademark Office*